United States Patent [19]

Slocum

[11] Patent Number: 5,683,118

[45] Date of Patent: Nov. 4, 1997

[54] KINEMATIC COUPLING FLUID COUPLINGS AND METHOD

[75] Inventor: Alexander H. Slocum, Bow, N.H.

[73] Assignee: Aesop, Inc., Concord, N.H.

[21] Appl. No.: 600,404

[22] Filed: Feb. 12, 1996

[51] Int. Cl.[6] .................................................. F16L 55/00
[52] U.S. Cl. ...................... 285/119; 285/131; 285/137.1; 285/334.4; 29/861; 439/283; 439/374; 439/577
[58] Field of Search ................................. 285/131, 334.4, 285/136, 137.1, 119; 29/861; 439/271, 283, 374, 577

[56] References Cited

U.S. PATENT DOCUMENTS

| | | | |
|---|---|---|---|
| 1,806,450 | 5/1931 | Ercanbrack | 285/334.4 X |
| 2,475,468 | 7/1949 | Andrews | 285/137.1 X |
| 3,429,581 | 2/1969 | Himmel | 285/334.4 X |
| 4,181,332 | 1/1980 | Neumann | 285/334.4 X |
| 4,679,829 | 7/1987 | Yanagisawa | 285/334.4 X |
| 4,776,615 | 10/1988 | Young | 285/137.1 X |
| 5,082,391 | 1/1992 | Florida | 285/334.4 X |
| 5,143,410 | 9/1992 | Takikawa | 285/334.4 X |

FOREIGN PATENT DOCUMENTS 411633  6/1934  United Kingdom ................. 285/137.1

Primary Examiner—Dave W. Arola
Attorney, Agent, or Firm—Rines and Rines

[57] ABSTRACT

A novel flexural kinematic fluid or electrical coupling in which a pair of components is deterministically kinematically coupled with repeatable accuracy of positioning with respect to one another by the use of three spherical surfaces on one component, and three grooves in the other component, and with holes passing through one component through the contact zones between the spherical surface-to-groove contact points and out through the other component. For electrical contact, instead of fluid flow holes at the Hertzian interface, electrical contact pads are used.

12 Claims, 2 Drawing Sheets

KINEMATIC COUPLING FLUID COUPLINGS AND METHOD

The present invention relates to kinematic coupling fluid couplings and seals therefor, being more particularly concerned with sealing techniques in such couplings and the novel concept of the invention in the use of a center hole, made through the deterministically located Hertzian contact zones in a kinematic coupling, as a means to pass fluid from one side of the coupling to another, whereby the sealing action obtained is via the high contact stresses that exist around the formed hole in the center of the Hertzian contact zone.

BACKGROUND

It is virtually impossible to make two surfaces flat enough to mate perfectly such that a multitude of holes in the mated bodies can then pass fluid (liquid or gaseous) between them without leaking. Fundamentally, large flat surfaces in contact have low contact stresses between them, so any reasonable pressure fluid bleeds out between the surfaces until it forms a large enough low pressure spot size to cause leakage. To prevent this from happening, gaskets or other compliant sealing materials are customarily used to achieve a mechanical seal, but with the deleterious development of crevices and other surfaces that attract dirt or generate particles during repeated use and affect the integrity of the seal.

Kinematic couplings have long been known to be able to provide sub-micrometer repeatability because they use spherical surfaces (e.g., hemispheres) anchored to one part or surface to mate with three centrally pointing grooves in another part or surface. This provides six points of contact which, both mathematically and practically, deterministically defines the six degrees of freedom needed to define the position and orientation of one part or surface with respect to another.

Such ball and groove kinematic couplings have been used in a myriad of applications whereby two mechanical elements must be coupled together with high accuracy and repeatability, as described, for example, by applicant A. H. Slocum in *Precision Machine Design*, Prentice Hall, Englewood Cliffs. N.J., 1992, and in "Design of Three-Groove Kinematic Couplings," *Precision Eng.*, Vol. 14, No. 2, April 1992, pp 67–76. These couplings are deterministic in that the mating parts make contact at a number of points equal to the degrees of freedom being constrained. To constrain two mating parts or surfaces in three dimensional space, for example, as before stated, six points of contact are needed to constrain three translational degrees of freedom and three rotational degrees of freedom. Three balls, each sitting in a groove, will accomplish this task since, for each ball and groove, there exist two points of contact.

An example is disclosed in U.S. Pat. No. 4,574,625, assigned to Federal Products Corp., which shows a kinematic coupling used to mount a measurement probe to a holder with the use of a magnet to preload and hold the coupling together. This gives high stiffness but lets the coupling release the probe should the probe be struck, thereby preventing damage to the probe. Such techniques, however, do not allow for a soft engagement of the probe in the coupling, nor do they allow one body to continue to move in one direction after it is kinematically engaged.

Other improvements are described, for example, in U.S. patent application Ser. No. 08/568,612 filed Dec. 7, 1995, for Flexural Mount Kinematic Couplings and Method of common Assignee herewith. It should be noted, however, that none of these applications ever considers the use of kinematic couplings for anything other than coupling two bodies together. Kinematic coupling provides a means to bring the two bodies together with a high degree of repeatability and thus virtually zero particle generation. While such fluid coupling may be used to locate its respective parts, compliant sealing elements, such as gaskets or O rings, are required that still act as dirt gatherers.

The present invention, on the other hand, is directed towards the development of kinematic couplings to perform other functional requirements including self-sealing.

The invention described herein is to tune the design of the kinematic coupling by using soft materials for the ball and groove to obtain a large, on the order of 1 cm, contact zone at each of the six kinematic contact points. A hole is provided, however, from one half of the coupling through the contact zone, to the other half, allowing fluid to pass from one half of the coupling to the other. The inherent repeatable location and high contact stress at the contact points around the holes in such a novel construction has been found to prevent leakage.

Laboratory tests, indeed, have shown that a kinematic coupling with aluminum Vee grooves with ⅛" holes at the contact point centers and ¾" diameter Teflon balls with ⅛" holes at the contact point centers can hold at least 100 psi pressure with zero leaks. The preload pressure required to hold the coupling together was only 10 pounds.

OBJECTS OF THE INVENTION

An object of the present invention, accordingly, is to provide a new and improved kinematic coupling apparatus and method for deterministically and very repeatably locating two halves of a fluid coupling, such that the coupling passages for transfer of fluid are located in the center of the Hertzian contact zones of the kinematic coupling, preferably by holes through the contact zone to effect a self-sealing joint.

A further object is to provide a means repeatably to form a fluid coupling joint without generating particles or creating surfaces on which particles can precipitate out of a flow.

Other and further objects will be explained hereinafter and are more fully delineated in the appended claims.

SUMMARY

In summary, the invention embraces a flexural kinematic coupling having, in combination, a pair of mating components to be deterministically kinematically coupled; three substantially spherical surfaces disposed on one component to mate with three corresponding grooves in the other component, establishing six contact points enabling such kinematic coupling with repeatable accuracy of positioning with respect to one another; alignable holes provided through the surfaces and grooves for passing fluid therethrough between the components; and means for sealing the components together (under pressure) to align the holes and create Hertzian deformation contact zones with high stress around the aligned holes to effect repeatable self-sealing of the coupling.

Thus, more generally, a preloaded kinematic coupling apparatus and technique are provided for precisely and repeatably adjacently locating two halves of a fluid transfer coupling having mating balls and grooves respectively carried by the adjacent coupling halves for kinematically locating the coupling halves with six degrees of freedom and with precision and repeatability. When one to six fluid passage holes are located at the respective centers of the resulting Hertzian contact deformation zone(s), high Hertzian stresses in the contact ring around the hole(s) completely and uniformly surround and seal the hole(s) so the fluid may flow through the coupling without leaking, and without requiring any type of gasket or seal, such as an O ring.

The invention is concerned with using a kinematic coupling precisely and repeatably to form a fluid coupling such that the coupling repeatably self-seals and allows for leak-free transfer of fluid across a joint without generation of particles or creating edges due to misalignment that can act as particle precipitators.

Preferred and best mode embodiments and techniques are hereinafter described.

DRAWINGS

The invention will now be described with reference to the accompanying drawing in which:

FIG. 1 a perspective view of two halves of a kinematic fluid coupling constructed in accordance with the invention, where the spherical halves of one side of the coupling are shown cut-away from their half of the coupling, and located as they would sit in the vee grooves in the other half of the coupling;

PREFERRED EMBODIMENT(S) OF THE INVENTION

This invention, as above explained, achieves its objectives by establishing the relative position of two adjacent halves of a flexural coupling with the use of a three-ball, three groove kinematic coupling. In traditional three-groove kinematic couplings, there are normally six contact areas (points), which are circular when equilaterally spherical (or substantially or partially spherical) mating elements are used, and the contact areas are continuous footprint areas caused by elastic deformation of the spherical element in the groove.

As previously described, the invention provides holes formed from one side of the coupling to the other and passing through the contact zones, establishing high Hertzian stresses in the contact zones along the peripheries of the holes effectively to seal the holes so that no fluid (liquid or gaseous) can leak out. When the coupling is assembled, because it is kinematic, it will go together with minimal friction and formation of particles, because the kinematic coupling is so repeatable. Furthermore, the holes formed through the coupling will always perfectly align every time, thereby minimizing the formation of particle build-up that normally occurs on ledges formed at the interface holes in plates that are bolted together.

Figure 1:
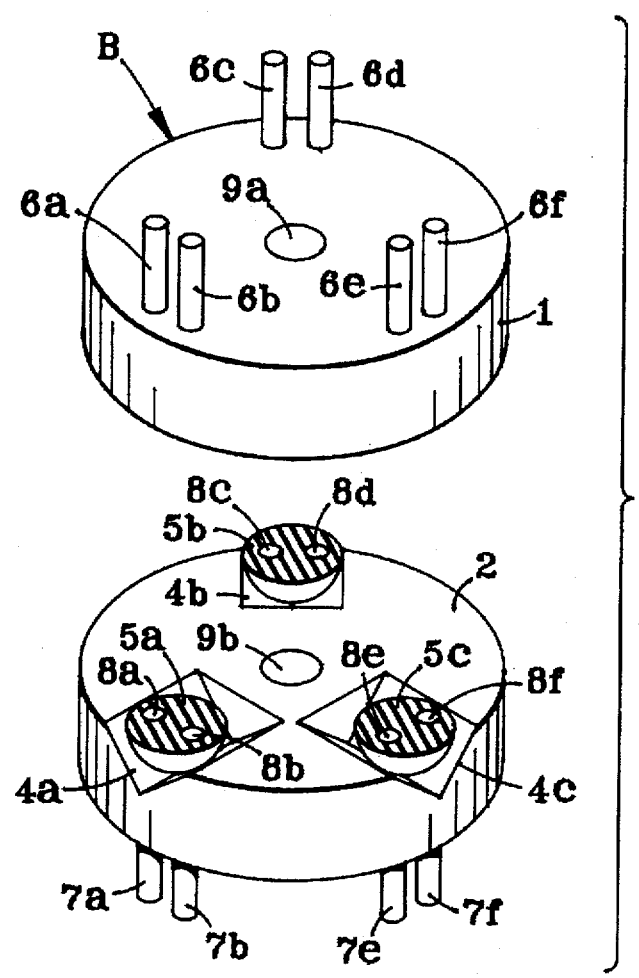
Figure 2:
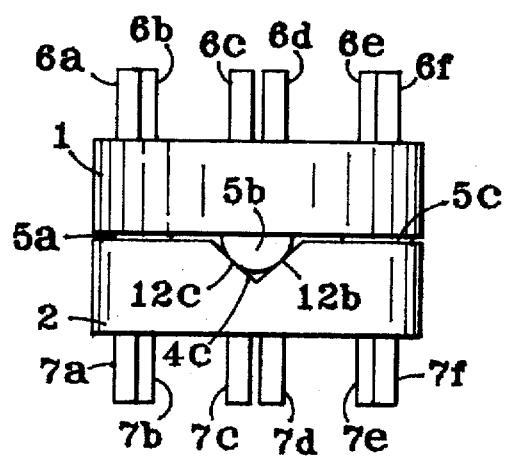
FIG. 2 shows a side view of the assembled kinematic fluid coupling.

FIG. 1 and FIG. 2 show the upper half 1 of the kinematic fluid coupling which has fluid connections 6a, 6b, and 6c, 6d, and 6e, 6f that will pass through equally spaced spherical elements 5a, 5b, and 5c, respectively, protruding below the flat inner surface of the upper component. As shown in FIG. 1, the spherical elements 5a, 5b, and 5c are cut away from the upper half 1 of the coupling to which they are otherwise normally attached. Pairs of parallel holes 8a, 8b, and 8c, 8d, and 8e, 8f are shown provided through the spherical elements and are connected to fluid connections 6a, 6b, and 6c, 6d, and 6e, 6f respectively passing through the spherical elements 5a, 5b, and 5c that make contact at two points each in V-shaped grooves 4a, 4b, and 4c channeled in the flat inner surface of the lower half 2 of the fluid coupling. Fluid will pass through the upper half component 1 into the lower half component 2 via these holes between the contact zones created by the spherical elements 5a, 5b, and 5c mating with the grooves 4a, 4b, and 4c, respectively. The fluid will then exit out the bottom half of the coupling element 2 via pairs of exits 7a, 7b and 7c, 7d, and 7e, 7f.

In order for the flexural coupling to be properly sealed, a preload force, such as provided by a central bolt that would pass through hole 9a and thread into hole 9b, schematically represented as B, FIG. 1, (or any other suitable clamping device) must be provided to create a Hertzian deformation contact area or zone that is larger, typically by 25%, than the hole through the center of the intended contact zones.

Figure 4:
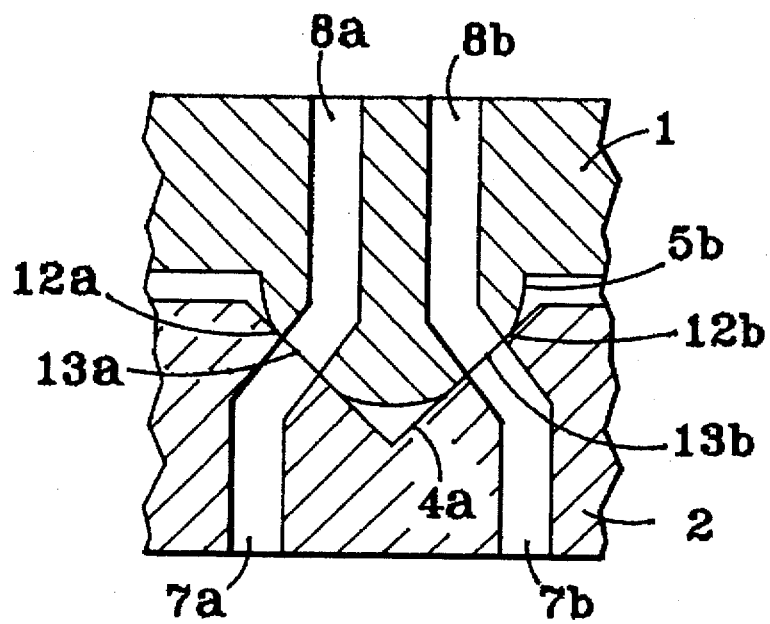
FIG. 4 is a cutaway view of one of the spherical members and its associated mating groove in the fluid kinematic coupling.

As shown in FIG. 4, fluid enters the coupling, for example, through holes 8a and 8b in the upper half 1 of the coupling. The pair of holes 8a and 8b extends through the upper structure and down into the spherical protrubance 5b. This spherical structure may be integrally molded or otherwise attached as, for example, by bonding. The fluid then passes through the holes 13a and 13b in the lower half 2 of the coupling and then exits out of grooves 7a and 7b. Contact regions 12a and 12b in the groove 4a surround the holes 13a and 13b, respectively, and effect a self-seal because of the high contact stress level along the hole peripheries, and because the surfaces are always exactly in alignment due to the nature of the operation of the kinematic coupling. Valves, not shown in order not to detract from the novel features of the invention, but known to those skilled in the art, would be used first to shut off the flow of fluid before the coupling is decoupled.

Figure 3:
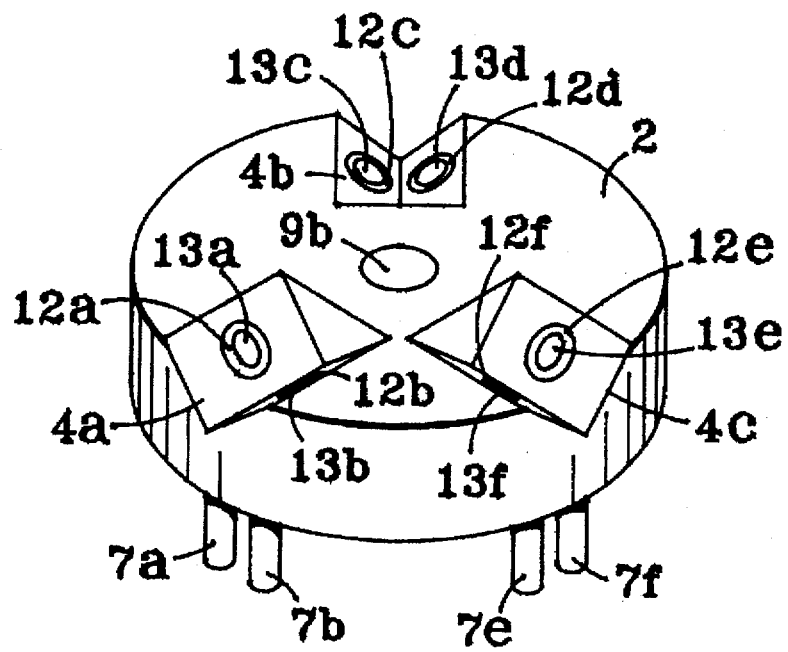
FIG. 3 shows the vee-grooved half of the kinematic fluid coupling.

FIG. 3 shows the lower half of the coupling in greater detail. Grooves 4a, 4b, and 4c provide the areas where the spherical surfaces from the upper half of the coupling mate. In each of the grooves, corresponding pairs of holes 12a, 12b and 12c, 12d, and 12e, 12f are provided. Each of theses holes becomes surrounded by the high contact stress sealing areas 13a, 13b and 13c, 13d, and 13e, 13f, respectively. In a normal planar coupling, one could never have six contact points all touching a surface because only three points define a plane. Two flat surfaces would also be prone to shear, and, in addition, would also require many preload points to keep elastic preload deflections from breaking contact and allowing leakage. It is a unique feature of this invention, on the other hand, that, as a singe preload point increases the preload force, the coupling seals ever better against increasing pressures.

The kinematic fluid coupling of the invention, moreover, can be made inexpensively from molded plastic. It may be molded integral with flexural valves, such as peristaltic valves or other well-known valves that mimic, for example, the valve function attained by elastic elements in the human body. The result is a leak-proof clean coupling system that can find widespread usage in industries where extreme purity is a must, such as the semiconductor and pharmaceutical industries, and also where self-sealing is an attribute, as in the petrochemical industry, among others.

Furthermore, for industrial applications, the invention can be used to handle dangerous fluids, where seal failure due to degradation of a rubber seal could be catastrophic. The invention would also be extremely useful for liquid gas (cryogenic) coupling applications. There could also be degenerate forms of the coupling where less than six, or more than six points of contact are used in a configuration that uses preload forces to hold the system in reasonable alignment. Still, in theses cases, the fundamental invention is used whereby the Hertz contact footprint area is used as a region of high intimate contact stress to act as a seal around a central hole.

Taking the concept a step further, but still using the principle of high local Hertz stresses, instead of passing fluid energy through the central hole, electrical power could be transmitted across electrically conductive pads, schematically also represented as 13 on the vee groove 4 and ball 5 in FIGS. 3 and 4, at the contact interfaces. Once again the high local contact stresses formed repeatably will provide high reliability of the connections.

Further modifications of the invention will also occur to persons skilled in the art, and all such are deemed to fall within the spirit and scope of the invention as defined in the appended claims.

What is claimed is:

1. A flexural kinematic coupling having, in combination, a pair of mating components to be kinematically coupled; three substantially spherical surfaces disposed on one component to mate with three corresponding grooves in the other component, establishing six contact points therebetween enabling such kinematic coupling with repeatable accuracy of positioning with respect to one another; alignable holes provided through the surfaces and grooves for passing fluid therethrough between the components; and means for sealing the components together under pressure to align the holes and create by such pressure deformation contact zones with high stress around the aligned holes to effect repeatable self-sealing of the coupling.

2. A coupling as claimed in claim 1 and in which the spherical surfaces are balls each provided with a pair of parallel holes extending therethrough, and the grooves are substantially V-shaped with the sides of the V each provided with a hole to align with the corresponding holes of the respective ball.

3. A coupling as claimed in claim 2 and in which components have flat inner surfaces, the balls protrude from a flat inner surface of one component, and the grooves are channeled in a mating flat inner surface of the other component.

4. A coupling as claimed in claim 1 and in which the means for sealing comprises preload force-producing means.

5. A coupling as claimed in claim 4 and in which the preload force is provided by means disposed centrally of the coupling.

6. A method of flexural kinematic fluid coupling of a pair of inner-surface components to be kinematically coupled, that comprises, providing an inner mating surface of one component with three substantially equally spaced spherical surfaces; providing the inner mating surface of the other component with three correspondingly spaced substantially V-shaped grooves which, when receiving the respective spherical surfaces therein, establish six contact points that enable kinematic coupling; providing holes through the spherical surfaces and corresponding holes in the walls of the V-shaped grooves for respective alignment therewith; and seating the components together under pressure to align the holes and create by such pressure deformation contact zones with high stress around the aligned holes to effect repeatable self-sealing of the coupling.

7. A method of self-sealing kinematic fluid coupling of a pair of mating components to be kinematically coupled, that comprises, providing mating spherical surface means on one component and corresponding groove means in the other component for establishing contact points for kinematic coupling; providing alignable holes through the spherical surface means and the corresponding groove means at the contact point; and flowing fluid through the aligned holes after pressure-seating the mating components to create by such pressure deformation contact zones with high stress around the aligned holes, effecting repeatable self-sealing of the coupling.

8. A method as claimed in claim 7 and in which the spherical surface means comprises three equilaterally spaced balls and the groove means comprises three corresponding substantially V-shaped channels, and each of the spherical surfaces and grooves is provided with said holes.

9. A method of flexural kinematic electrical coupling of a pair of mating components to be kinematically coupled, that comprises, providing an inner mating surface of one component with three substantially equally spaced spherical surfaces; providing the inner mating surface of the other component with three correspondingly spaced substantially V-shaped grooves which, when receiving the respective spherical surfaces therein, establish six contact points that enable kinematic coupling; providing electrical contact pads through the spherical surfaces and corresponding electrical contact pads in the walls of the V-shaped grooves for respective alignment therewith; and seating the components together under pressure to align the pads and create by such pressure deformation contact zones with high stress around the aligned pads to effect repeatable self-electrical contacting of the coupling.

10. Flexural kinematic coupling having, in combination, a pair of mating components to be kinematically coupled; three substantially spherical surfaces disposed on one component to mate with three corresponding grooves in the other component, establishing six contact points therebetween enabling such kinematic coupling with repeatable accuracy of positioning with respect to one another; alignable means provided in the surfaces and grooves for passing one of fluid flow and electric current flow into, between and out of the components of the coupling; and means for sealing the components together under pressure to align the alignable means and create therearound, by such pressure, deformation contact zones with high stress to effect repeatable self-sealing of the coupling.

11. A flexural kinematic coupling as claimed in claim 10 and in which the alignable means are contacting holes provided through the surfaces and grooves for passing fluid therethrough.

12. A flexural kinematic coupling as claimed in claim 10 and in which the alignable means are contacting electrical contacts provided on the surfaces and grooves for passing electric current therebetween.

* * * * *